United States Patent
Fish et al.

(10) Patent No.: US 6,574,556 B2
(45) Date of Patent: Jun. 3, 2003

(54) SYSTEM AND ASSOCIATED METHOD OF INTEGRATING SUBSCRIBER BASED TRAFFIC NAVIGATION AND HOSPITALITY DATA WITH A GLOBAL POSITIONING SYSTEM

(75) Inventors: Robert Fish, Gillette, NJ (US); Stephen Johnson, Erdenheim, PA (US); Chieh-Chung Chang, Plainsboro, NJ (US); Dennis Bushmitch, Somerset, NJ (US); David Braun, Denville, NJ (US); Mahfuz Rahman, South Brunswick, NJ (US); Luyang Li, Bordentown, NJ (US)

(73) Assignee: Matsushita Electric Industial Co., Ltd., Osaka (JP)

( * ) Notice: Subject to any disclaimer, the term of this patent is extended or adjusted under 35 U.S.C. 154(b) by 0 days.

(21) Appl. No.: 09/934,927

(22) Filed: Aug. 22, 2001

(65) Prior Publication Data

US 2003/0040867 A1 Feb. 27, 2003

(51) Int. Cl.$^7$ .............................................. G01C 21/00
(52) U.S. Cl. ...................... 701/213; 701/208; 701/209
(58) Field of Search ................................ 701/213, 214, 701/212, 211, 208, 209, 210; 342/357.1, 357.01

(56) References Cited

U.S. PATENT DOCUMENTS

| | | | |
|---|---|---|---|
| 5,177,685 A | | 1/1993 | Davis et al. |
| 5,767,795 A | | 6/1998 | Schaphorst |
| 5,835,881 A | | 11/1998 | Trovato et al. |
| 6,336,073 B1 | * | 1/2002 | Ihara et al. ................ 701/208 |
| 6,336,074 B1 | * | 1/2002 | Woo .......................... 701/208 |
| 6,442,478 B2 | * | 8/2002 | Hamada et al. ............ 701/209 |

* cited by examiner

Primary Examiner—Richard M. Camby
(74) Attorney, Agent, or Firm—RatnerPrestia

(57) ABSTRACT

A global positioning system (GPS) is provided for displaying static cartographical data in accordance with a GPS signal and integrating dynamically updated data during display. The GPS system includes a receiver responsive to the global positioning signal. The receiver has a first communication module responsive to a signal of a content provider. The signal of the content provider defines dynamic content. The receiver has a data processor for integrating the dynamic content with the static cartographical data. A display device of the GPS system displays the integrated cartographical data and dynamic content. In this way, the dynamic content is provided to the global positioning system to alert an operator of traffic patterns and hospitality venues in relation to displayed static cartographical data.

16 Claims, 6 Drawing Sheets

SYSTEM AND ASSOCIATED METHOD OF INTEGRATING SUBSCRIBER BASED TRAFFIC NAVIGATION AND HOSPITALITY DATA WITH A GLOBAL POSITIONING SYSTEM

BACKGROUND OF THE INVENTION

The present invention relates to a portable navigation device, and, more particularly, to a global positioning system (GPS) device adapted to receive regional traffic navigation and hospitality data for integration with GPS data.

Global positioning systems are increasingly utilized as a source of navigation information. Although initially designed for military use, orbiting satellites transmitting GPS signals have been widely used in commercial navigation systems for determining and displaying a receiver location.

A GPS receiver calculates a position based on detected GPS signals. The GPS receiver "triangulates" its own position by obtaining the GPS signals from a set of satellites, typically three of four orbiting satellites. The position of the receiver is determined in the form of a geographic position—longitude and latitude—to, for most receivers, within meters of an actual location. Typically, the receiver is equipped with a display screen that shows a map (i.e., cartographical position), thus, position can be displayed on the generated map. If a signal from a fourth satellite can be received, the receiver can determine the altitude of the GPS receiver as well as the geographic position. If the receiver is moving, the receiver may also calculate speed and direction of travel, yielding estimated times of arrival to specified destinations.

GPS receivers are increasingly being employed in vehicles as a source of navigational information. Typically, a GPS receiver serves to guide a vehicle operator to/from a destination, the GPS receiver providing latitudinal and longitudinal coordinates and relative location with respect to a desired destination. Some automobile manufacturers provide a further concierge service such as ONSTAR® to use in conjunction with the GPS receiver for identifying area attractions, alternative routes, detours and the like.

SUMMARY OF THE INVENTION

A system and associated method of integrating subscriber based traffic navigation and hospitality data is provided in which dynamic content such as that typically provided by a concierge service is integrated with the functionality of a GPS receiver.

The present invention provides a global positioning system (GPS) for displaying static cartographical data in accordance with a GPS signal and integrating dynamically updated data during display. The GPS system includes a receiver responsive to GPS signals. The receiver has a first communication module responsive to a signal of a content provider. The signal of the content provider defines dynamic content. The receiver has a data processor for integrating the dynamic content with the static cartographical data. A display device of the GPS system displays the integrated cartographical data and dynamic content. In this way, the dynamic content is provided to the global positioning system to alert an operator of traffic patterns and hospitality venues in relation to displayed static cartographical data.

A method in accordance with the present invention, receives a global positioning signal from a global positioning signal source for indicating a cartographical location of the GPS display system. A dynamic content signal is also received from a content provider. Local content data is filtered from the dynamic content data of the dynamic content signal. The dynamic local content is then integrated with the cartographical location and displayed by a display device of the GPS system. In this way, the dynamic local content is provided to the GPS display system to dynamically inform an operator of traffic patterns and hospitality venues along static cartographical routes of the GPS display system.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
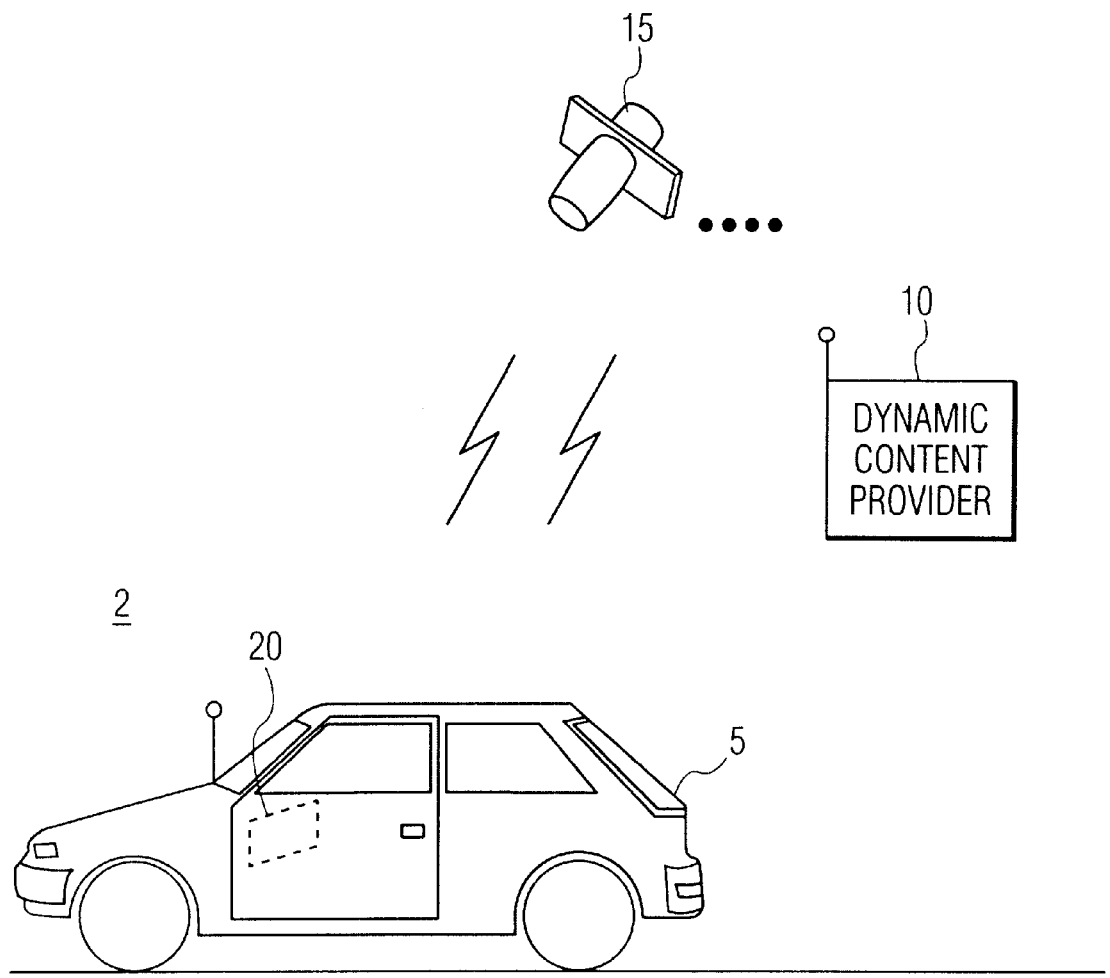
FIG. 1 is a perspective view of a global positioning system (GPS) in accordance with the present invention.

Certain terminology used in the following description is for convenience only and is not limiting. The term "dynamic content" refers to content provided to the global positioning system which is not utilized to identify a location of the receiver, rather to provide information regarding the cartographical area pertaining to the location of the receiver. Thus, without limitation, dynamic content may include one or more of the following illustrative examples, traffic patterns, construction information, bridge openings, restaurant/hotel information and the like. The term "integration" or "integrating" as used herein refers to the reception of the dynamic content by the receiver, the dynamic content may be provided to the operator of the receiver as visible or audible indicia or stored in memory for later use. In the drawings, the same reference numerals are used for designating the same elements throughout the several figures.

The present invention provides a global positioning receiver and associated method of integrating dynamic content with cartographical data of a display device coupled to the global positioning receiver.

The global positioning system (GPS) is provided for displaying static cartographical data in accordance with a GPS signal and integrating dynamically updated data during display. The GPS system includes a receiver responsive to the global positioning signal. The receiver has a first communication module responsive to a signal of a content provider. The signal of the content provider defines dynamic content. The receiver has a data processor for integrating the dynamic content with the static cartographical data. A display device of the GPS system displays the integrated cartographical data and dynamic content. In this way, the dynamic content is provided to the global positioning system to alert an operator of traffic patterns and hospitality venues in relation to displayed static cartographical data.

A GPS system according to the present invention may be implemented as a stand-alone product or may be integrated with an audio/video entertainment device. For the sake of simplicity, elements of the integrated audio/video entertainment device that are not used by the GPS system are not described.

I. Main Components

Referring now more specifically to the drawings, FIG. 1 shows a perspective view of an exemplary embodiment GPS system 2 in accordance with the present invention. The GPS system 2 includes an integrated receiver 20, a dynamic content provider transmission source 10, hereinafter "DCPTS", a satellite signal source 15, and a vehicle 5. In an exemplary embodiment, the receiver 20 is operably linked to an instrument panel of a vehicle 5 (i.e., vehicle electrical system not shown) for receiving a power signal. Although the receiver 20 is described in terms of a vehicular/mobile system, those skilled in the art will recognize that the present invention is generally applicable to any receiver. Similarly, the integrated receiver 20 may be portable and powered by alternative power sources such as a battery cell, solar collector or the like.

In the exemplary embodiment, the integrated receiver 20 is a portable receiver which is releasably mounted (not shown) in vehicle 5. Those skilled in the art will recognize that the receiver 20 can be releasably mounted to vehicle 5 in a variety of known manners, the selection of which is a matter of design choice.

The receiver 20 is provided for integrating the dynamic content of DCPTS 10 with cartographical data. GPS signals are transmitted to Integrated receiver 20 by satellite signal source 15. The Integrated receiver 20 is responsive to the GPS signals of the satellite signal source 15 for identifying latitudinal and longitudinal coordinates corresponding to the position of the Integrated receiver 20. Those skilled in the art will recognize that GPS receivers are well known in the art, as such the description of determining latitudinal and longitudinal coordinates from GPS signals is omitted for the sake of brevity.

In the exemplary embodiment of the invention, the DCPTS 10 is provided to transmit a dynamic content signal to the Integrated receiver 20. The Integrated receiver 20 is responsive to the dynamic content signal for dynamically updating a display of receiver 20 for integrating the dynamic content with displayed cartographical data, or storing the dynamic content with cartographical data in a memory thereof for use by the display. In the exemplary embodiment, the dynamic content of DCPTS 10 may be provided on a subscription basis to operators of INTEGRATED receivers 20 in accordance with the present invention.

In use, the Integrated receiver 20 identifies latitudinal and longitudinal coordinates from signals of the satellite signal source 15 and determines a corresponding cartographical location of the coordinates based on mapping information stored in a memory of the receiver 20. The cartographical location is presented to the operator with integrated dynamic content. In the exemplary embodiment, receiver 20 includes a display device (described herein) for presenting a visual map of the cartographical location along with visible and/or audible indicia of corresponding dynamic content.

While the satellite signal source 15 of the exemplary embodiment is described as a set of global positioning satellites, those skilled in the art will recognize that the present invention is applicable to land originated positioning signals as well.

The DCPTS 10 is a transmitter for providing dynamic content to the receiver 20. In the exemplary embodiment, the DCPTS 10 may be an RF transmission source such as that utilized by cellular telephones, however the present invention is not limited to any specific carrier type/frequency. For example, in an alternative embodiment a satellite radio signal may be used where the DCPTS 10 is an orbiting satellite or a special communication authorization (SCA) signal may be used where the DCPTS 10 is an FM radio station. The DCPTS 10 provides dynamic content for a plurality of geographical locations from a single DCPTS 10. Those skilled in the art will recognize that the DCPTS 10 may be a plurality of DCPTS transmission sources each dedicated to a specific geographical location.

The DCPTS 10 in the exemplary embodiment simultaneously transmits dynamic content for a plurality of geographical regions to the Integrated receiver 20. The Integrated receiver 20 includes a dynamic content filter to select the dynamic content which corresponds to its present location. The filter functionality may be employed by hardware or software components of receiver 20 (not shown).

In this way, the global positioning system 2 of the exemplary embodiment enables the display of static cartographical data having integrated dynamic content.

II. Integrated Receiver

Figure 2:
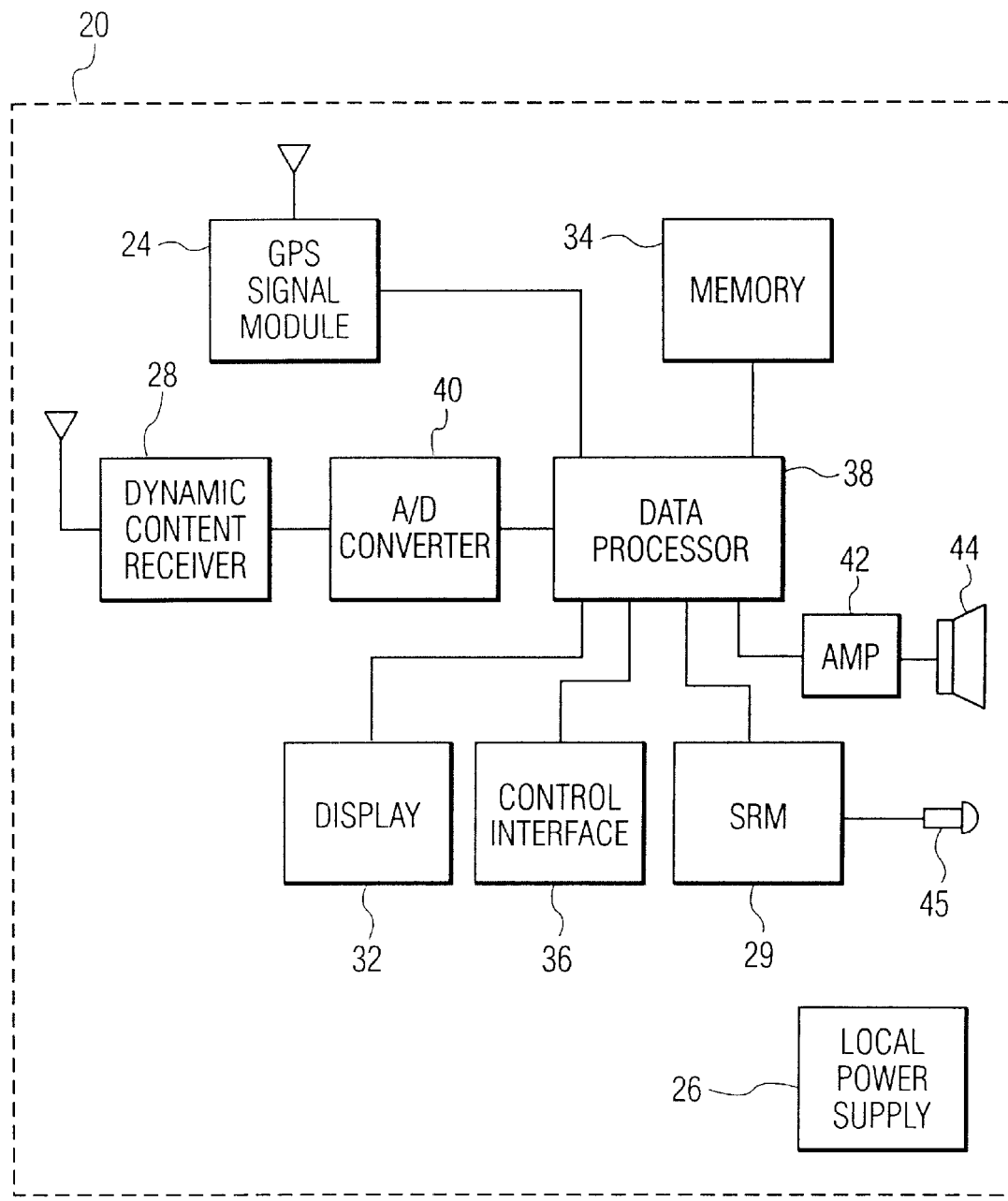
FIG. 2 is a high level block diagram of the receiver of FIG. 1 in accordance with an exemplary embodiment of the invention.

Referring now to FIG. 2, in an exemplary embodiment, Integrated receiver 20 may include, for example, GPS signal module 24, dynamic content receiver 28, display 32, analog to digital (A/D) converter 40, data processor, 38, speech recognition module (SRM) 29, control interface 36, amplifier 42, local power supply 26, memory 34, microphone 45 and speaker 44.

The GPS signal module 24 of Integrated receiver 20 is provided for detecting GPS signals of GPS signal source 15. As discussed above, the GPS signal module 24 receives a GPS signal for identifying the latitudinal and longitudinal coordinates of the Integrated receiver 20. The data processor, in accordance with a corresponding instruction set, determines a cartographical location of the identified coordinates. For example, the data processor selects a cartographical location from cartographical data stored in memory 34 in accordance with the identified latitudinal and longitudinal coordinates. As the correlation of coordinates to cartographical data is well known in the art, further discussion is omitted for the purposes of brevity. In this way, the GPS signal module detects coordinates, the data processor 38 correlates the coordinates to a cartographical location in memory 34, and the Integrated receiver 20 provides the cartographical location to display 32 for navigational use by an operator.

The data processor 38 communicates control information with the A/D converter 40, GPS signal module 24, speech recognition module (SRM) 29, dynamic content receiver 28, display 32, control interface 36, amplifier 42, and memory 34 as indicated via the solid lines. The data processor 38 includes an instruction set for identifying a cartographical region corresponding to a detected GPS signal and identifiable latitudinal and longitudinal coordinates. The data processor 38 maps a cartographical location to display 32 corresponding to the latitudinal and longitudinal coordinates from cartographical data stored in memory 34. Similarly, the data processor 38 may, for example, determine, responsive to an operator selection via control interface 36, or display 32 which transmitted or stored dynamic content is to be accessed.

Microphone 45 is provided for detecting an audio input sound to receiver 20. In an exemplary embodiment, the microphone 45 provides spoken utterances from an operator to speech recognition module 29 (SRM) for converting the spoken utterances into control parameters for use by data processor 38 or as an alternative means to access dynamic content as described herein.

The SRM module 29 of the exemplary embodiment is responsive to an input audio signal for dynamically converting the audio data into recognized control parameters. Generally, the microphone 45 provides audio signals to an input port of the SRM module 29 for processing. The SRM module 29 performs signal filtering to identify audio segments including speech components and separate the speech segments from the audio input. The SRM module 29 then processes the speech signals through filters to identify various components which are applied to speech models, such as hidden Markov models to convert the audio input into "phonemes" or speech parts. The phonemes are sent to a word matcher of SRM module 29, which selects a matching word from a word database stored in the memory 34 based on the identified phonemes of each word. The selected database word is then output from the SRM 29 for conversion to a control parameter by data processor 38. Data processor 38 or a dedicated panel display process or (not shown) may also be used for displaying text corresponding to the control parameters on the display 32. The exemplary word database of SRM module 29 may include a context module that distinguishes between homophones such as "to," "too" and "two." An exemplary SRM module 29 suitable for use with the present invention is described in U.S. Pat. No. 5,822,728 entitled MULTISTAGE WORD RECOGNIZER BASED ON RELIABLY DETECTED PHONEME SIMILARITY REGIONS.

The memory 34 of Integrated receiver 20 is provided for storing dynamic content from DCPTS 10, storing static cartographical content, and system operational data such as lookup tables and the like. In the exemplary embodiment of FIG. 2, the memory 34 may be a flash memory. In the exemplary embodiment, a portion of memory 34 is reserved for use by the data processor 38 to enable touch screen display functionality, menu systems and SRM database/processing data. In this embodiment, cartographical content is preloaded into the memory 34 upon manufacture. Changes to the cartographical data can be effected via a periodic refresh signal transmitted along with the dynamic content of DCPTS 10. For example, a cartographical refresh signal may be transmitted daily or weekly to include new routes, street names, etc. Dynamic content relating to hospitality venues, long term construction projects, scheduled bridge openings, rush hour traffic patterns, and the like may be stored in a cache of memory 34 for repeated use. The cached dynamic content would be stored for cartographical regions within a home area or a frequented destination, being updated only when necessary. Of course, cartographical or dynamic content data also may be exchanged/updated with memory 34 via an interface (not shown)

In the exemplary embodiment, speaker 44 of receiver 20 is provided for giving audible indications of GPS signals to an operator, or for alerting an operator of approaching hospitality venues. In the exemplary embodiment, an operator is alerted to a desired hospitality venue when coming within a predetermined distance of the desired venue. For example, an audible tone or spoken message may be given to operators approaching a known destination/hospitality venue or the operator may be given audible directions to the same. In the exemplary embodiment, the spoken message may be an advertisement provided to the DCPTS 10 by the hospitality venue for use by the system 2. The operator may enable or disable this function via a filter of receiver 20, or specifically identify types of venues which will produce an alert through a menu of the touch screen display 32. For example, where the operator of a vehicle 5 employs a SPEED PASS® to purchase gasoline from a MOBIL® service station, the operator may wish to be alerted to MOBIL® stations only. Such functionality can be used in conjunction with the fuel monitoring functionality discussed in more detail below. Similarly, operators who prefer a specific type of restaurant or hotel may also program their filter in accordance with such preferences such that only desired information is passed to the display 32 of receiver 20.

The amplifier 42 of receiver 20 is provided for processing audio signals provided to speaker 44 as known to those skilled in the art for such functions as impedance matching, amplitude and/or frequency modulation, noise suppression, electrical isolation and the like.

In an exemplary embodiment, display 32 of receiver 20 may be a liquid crystal display (LCD) having a "touch-screen" interface. The display 32 provides the cartographical location as well as dynamic content pertaining thereto, and visible indicia of selected control parameters. The display 32 includes processing circuitry such as an on screen display (OSD) circuit for providing textual data to the display 32 such that control parameters are still visible during use. In an alternative embodiment, the processing circuitry of display 32 may further include video processing circuitry for presenting video images for viewing analog and/or digital video signals to the display 32.

An exemplary control interface 36 includes control panel or "controls" 36 (shown best in FIG. 3) of receiver 20. The controls 36 provide an operator means for adjusting and/or entering control parameters to provide or adjust programmed routes and destination selection. In an exemplary embodiment, the controls 36 are provided as an alternative and/or additional source of control to that of the touch-screen display 32 and SRM 29. In an exemplary embodiment, the controls 36 are illuminated push-button switches for low-level lighting uses, however those skilled in the art will recognize that the function of controls 36 can be performed by any number of switching technologies including transmitted control parameters provided to control interface 36 via a wireless communication device (not shown).

The dynamic content receiver or "communication module" 28 is an RF communication module in the exemplary embodiment. The dynamic content signal of DCPTS 10 may be a satellite radio signal or a cellular signal. The dynamic content receiver 28 includes an antenna for detecting the dynamic content signal of DCPTS 10. The dynamic content receiver is responsive to the dynamic content signal of DCPTS 10 for providing dynamic content to Integrated receiver 20. Those skilled in the art recognize that content receiver 28 may be a digital receiver for receiving a digital signal.

Analog to digital (A/D) converter 40 receives dynamic content in analog form from dynamic content receiver 28 and converts it to a digital parameter for data processor 38. Those skilled in the art will recognize that converter 40 may be omitted where the dynamic content signal is transmitted in digital form.

In the exemplary embodiment, local power supply 26 is a rechargeable power supply such as a nickel-metal hydride or lithium ion cell. In the exemplary embodiment the power supply 26 of Integrated receiver 20 may be recharged by connecting the Integrated receiver 20 to a source of power (i.e., an automotive instrument panel or an automobile cigarette lighter power adapter also not shown).

The DCPTS 10 is a transmitting station. In the exemplary embodiment, the DCPTS 10 is an RF source providing dynamic content to a receiver 20. The DCPTS 10 may be a dedicated transmitter serving a specific geographic region, or a universal transmitter such as a satellite serving a relatively large geographic region. In the exemplary embodiment, a filter of dynamic content receiver 28 determines the dynamic content to be utilized from a universal DCPTS 10. In an alternative embodiment, the filter may be an adaptive filter for changing filtering characteristics as the receiver 20 moves between regions of dedicated DCPTS's 10.

III. Integrated Display

Figure 3:
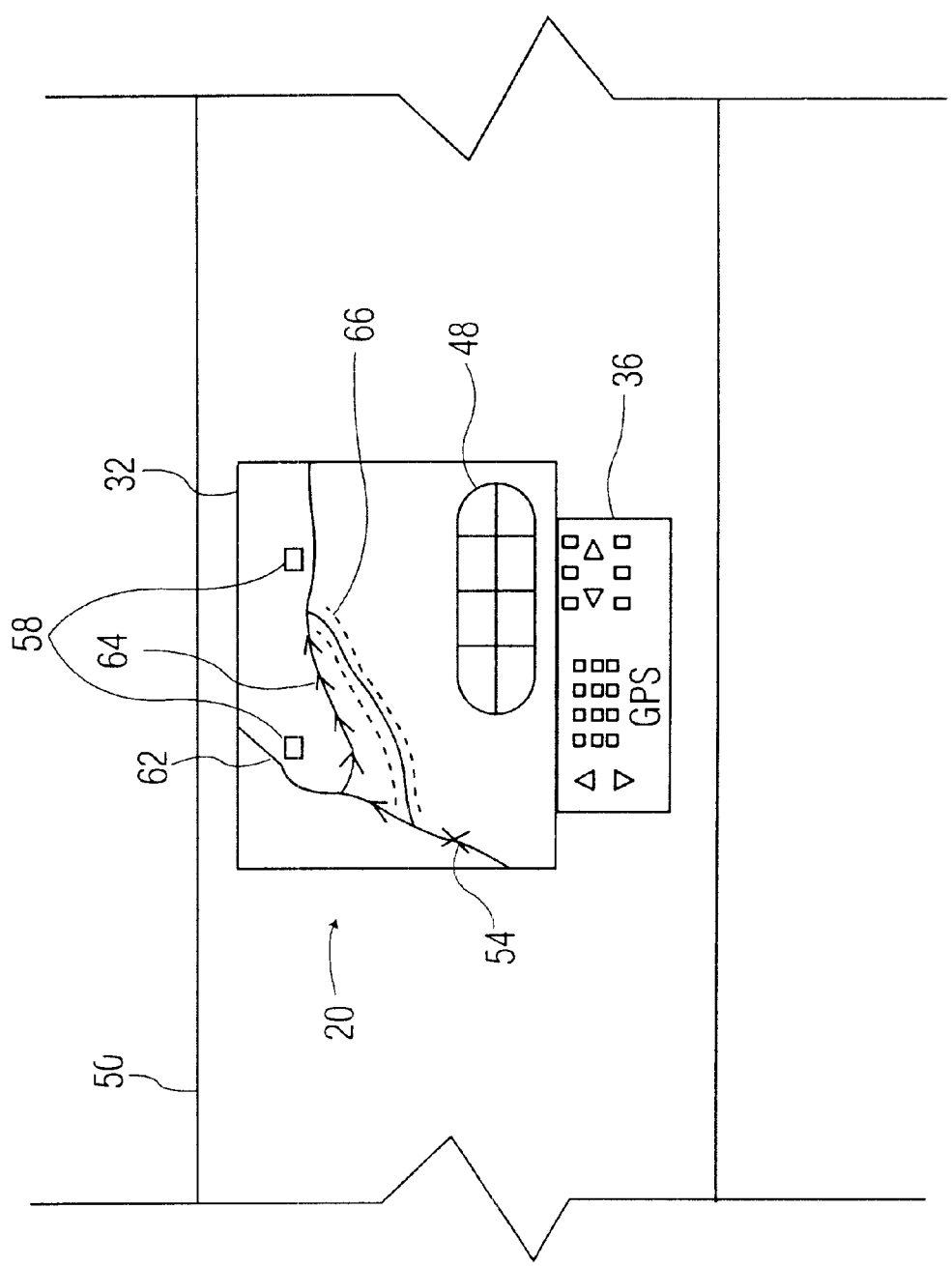
FIG. 3 is a front view of the receiver in accordance with an exemplary embodiment of the invention FIG. 1.

Referring now to FIG. 3, display 32 of Integrated receiver 20 is shown displaying cartographical and dynamic data content. The receiver 20 is shown mounted to an instrument panel 50 (shown cut-away) of automobile 5. The control interface 36 provides means for inputting data to the Integrated receiver 20. A receiver location 54, is designated by the "X" on display 32. A traveled route or primary cartographical route 62 is shown on display 32 and designated by arrowheads 64. An alternative cartographical route 62 is shown on display 32, and designated by a dashed border 66. Hospitality venues 58 are shown along the cartographical routes. A touch-screen sub-menu 48 is displayed for accessing further dynamic content (described below)

Figure 4:
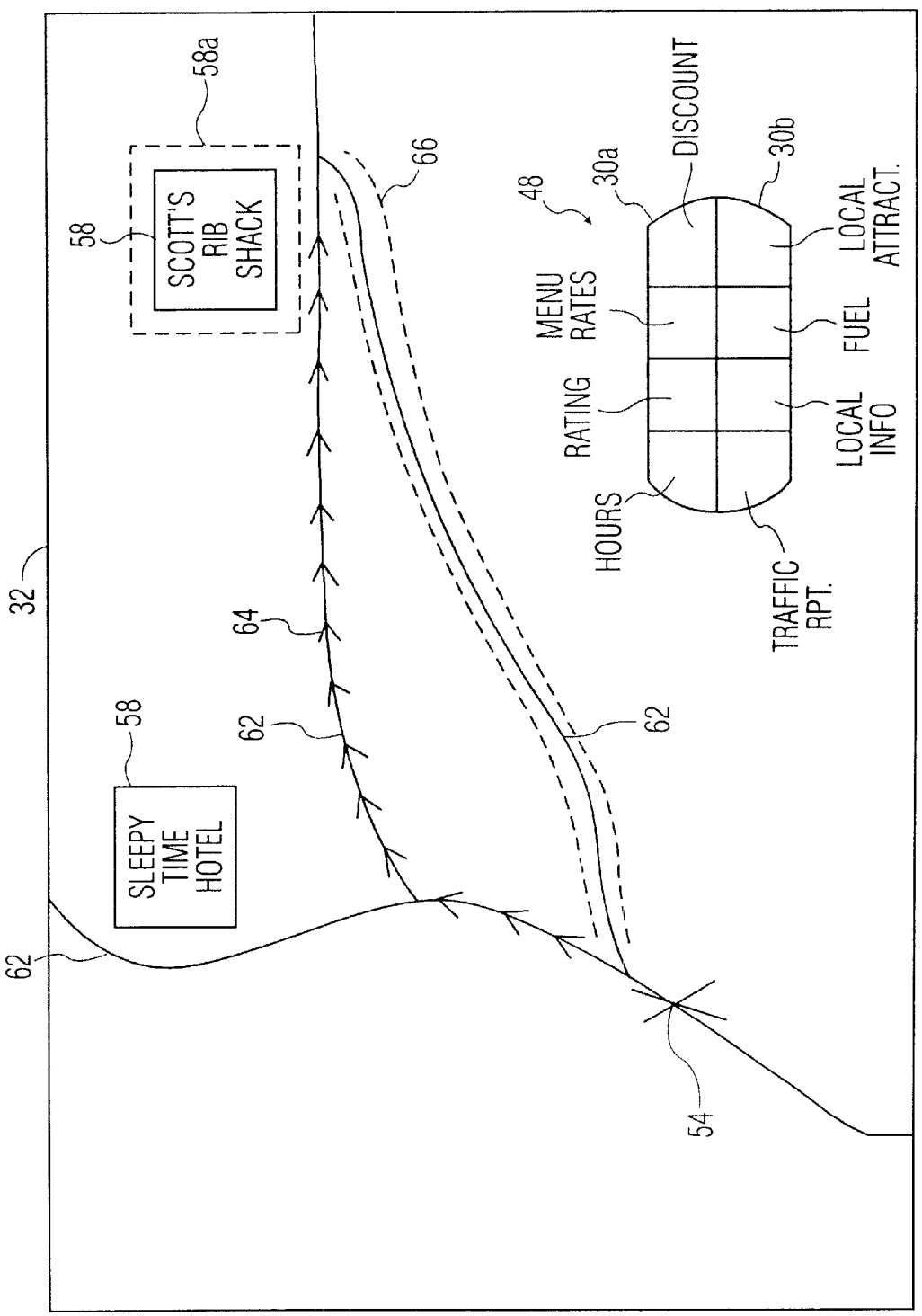
FIG. 4 is an enlarged view of the receiver display in accordance with an exemplary embodiment of the invention.

Referring now to FIG. 4, an enlarged display 32 of FIG. 3 is shown. By selecting the appropriate area of touch-screen sub-menu 48, section 30a is directed to hospitality dynamic content and section 30b is directed to traffic content, fuel level of the automobile and other data of local interest, the operator can access informational menus providing further dynamic content data (not shown). For example, the operator may be provided with a phone number, price data or "no vacancy" notice upon accessing the specific sub-menu relating to venue 58 SLEEPY TIME HOTEL, or menu selections and pricing for SCOTT'S RIB SHACK or the location of nearby refueling stations, identified by brand and price, when the fuel level falls below a predetermined amount.

For example, in use, an operator selects the hospitality venue SCOTT'S RIB SHACK by way of the touch screen display and/or control interface 36. When selected, the display 32 is then highlighted in the vicinity of the venue as indicated by the dashed box 58a. Once selected, the operator may access sub-menu section 30a for accessing more specific information, such as hours of operation, rating of the services, menu/lodging rates and available discounts to operators of receiver 20 transmitted to memory 34 as dynamic content. In the exemplary embodiment, the menus and visible display of hospitality venues may include proprietary designs and marks licensed for operators of receiver 20 in accordance with the present invention.

As designated by the arrowheads 64, a cartographical route 62 presently being traveled on, or selected by the operator as part of a primary route to a destination is indicated as having a congested traffic pattern. An alternative route cartographical route 62 is shown having dashed lines 66 on display 32. An operator at location 54 can then choose to access the traffic report via sub-menu section 30b to determine the cause of the congestion (i.e., temporary or long term) prior to choosing the alternative cartographical route. Those skilled in the art will recognize that congested patterns may similarly be displayed for any cartographical route in an cartographical display in addition to primary routes and/or traveled routes.

Upon selecting the "traffic" sub-menu of display 32, the operator may receive a text-based report of a specific route or cartographical area, similarly, the operator may receive an audible report via speaker 44. The remaining portions of sub-menu 30b are directed to other local information such as provided by area historical societies or chambers of commerce. The fuel status can be entered manually (i.e., after each refueling) or, may utilize a suitable interface to an automobile fuel monitoring system (not shown).

IV. Method of Operation

An exemplary method of operating Integrated receiver 20 will now be described in conjunction with FIGS. 5–6.

Figure 5:
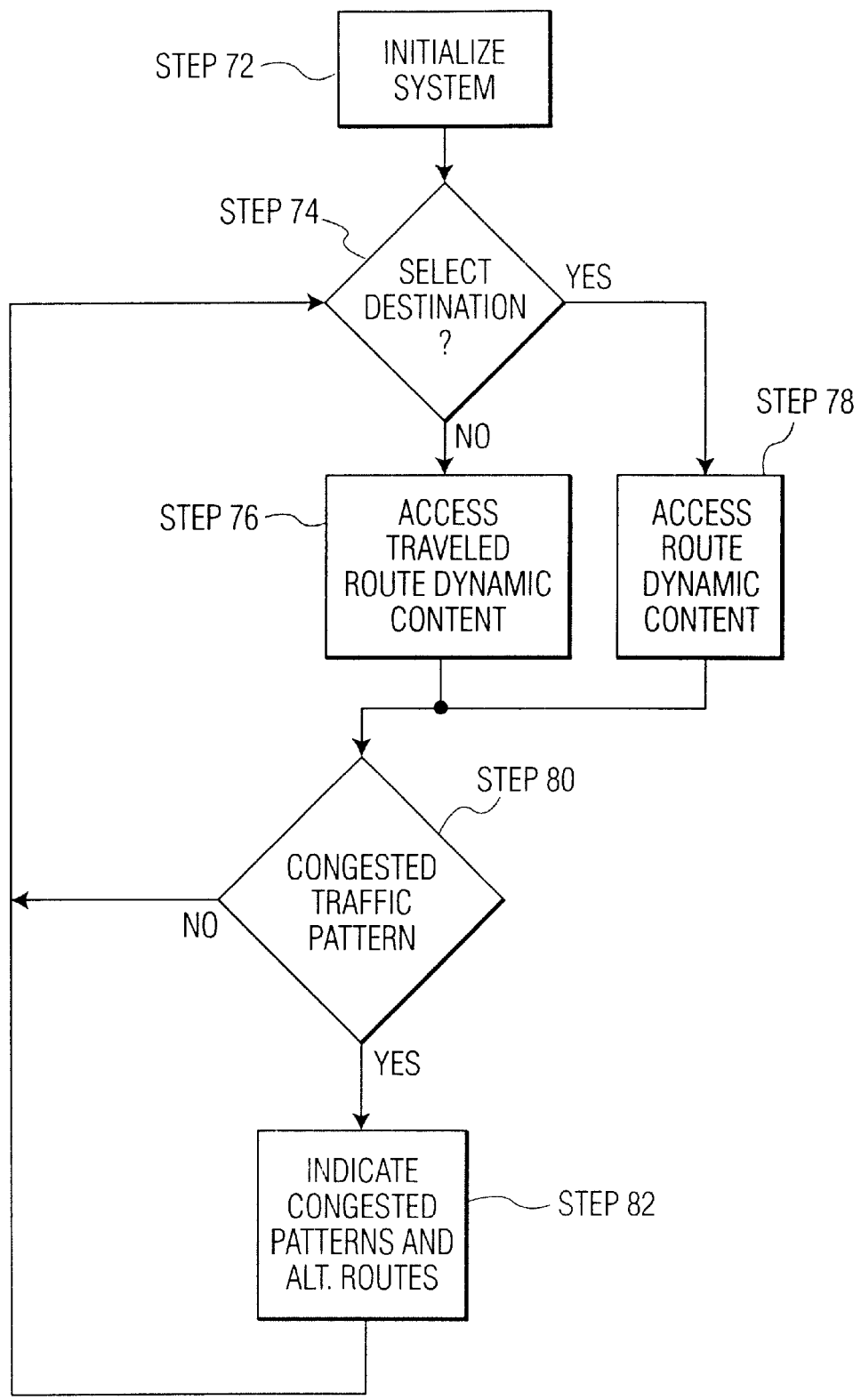
FIG. 5 is a flow chart showing the process of integrating dynamic content with cartographical data in accordance with an exemplary embodiment of the invention.

Referring to FIG. 5, an exemplary method of integrating dynamic content with cartographical data is shown. At step 72 an operator initializes the receiver 20. At step 74 the operator is prompted to enter a destination (i.e., longitudinal or latitudinal coordinate) via SRM 29 or control interface 36. At step 74, the operator may query memory 34 to identify the coordinates of a desired cartographical location, this is done by providing a U.S. postal zip code and/or address. If a destination is selected by the operator, in step 78 the receiver 20 selects the dynamic content from DCPTS 10 corresponding to the primary cartographical route for display. If no primary route/destination is selected, at step 76 dynamic content within a predetermined distance is accessed (e.g. 20 miles). If at step 80 a congested traffic pattern is detected, arrowheads such as 64 or suitable indicia are produced about the congested cartographical routes to alert the operator. If a congested pattern is displayed in step 80, an available alternative route is displayed via dashed lines 66 or suitable indicia for alerting the operator as to an available detour to avoid the congested pattern. Where no congested patterns are detected, the method loops back to step 74.

For example, an operator wishing to travel to a location, enters as much information as possible about the location (i.e., street address, city, state, zip code). Cartographical information corresponding the destination information, if any, is produced on display 32. The operator may then, via control interface 36 and/or the touch-screen, enlarge the relevant portion of the display. Once enlarged, the operator can select the closest landmark, intersection or similar navigation point to serve as the destination coordinates, or simply accept the location produced by the memory 34. Once the destination is entered, the receiver 20 receives dynamic content for integration with the cartographical route to the destination and produces it for display 32. Where no destination is selected by the operator, dynamic content is provided to the display in accordance with the receivers detected location. In the exemplary embodiment of the invention, the dynamic content may be transmitted with longitudinal and latitudinal information to allow the receiver 20 to filter out material that is irrelevant to the selected route.

Figure 6:
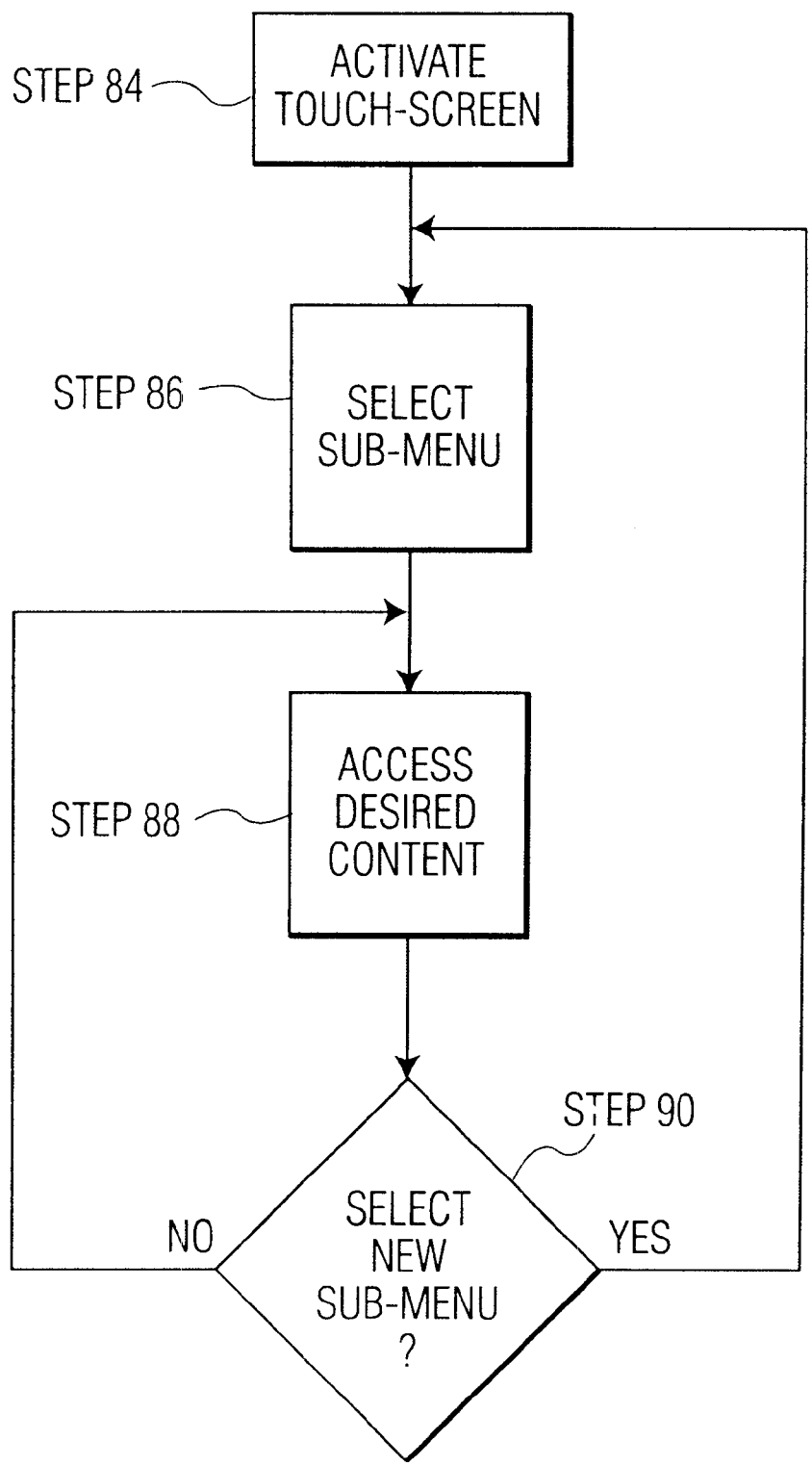
FIG. 6 is a flow chart showing the process of accessing dynamic content with the display of FIG. 4.

Referring now to FIG. 6, a method of accessing dynamic content from display 32 is shown. In step 84, the touch screen is activated by selecting a venue such as designated by box 58a in FIG. 4. In step 86, the sub-menu is accessed to provide further dynamic content with regard to the selected venue (in this example 58a). At step 88, the further dynamic content is accessed via speaker 44 or display 32. At step 90, the operator may select a separate menu or venue. While the above method is described for use with sub-menu section 30a, the sub-menu 30b may also be used in a similar manner. With sub-menu 30b, an area of the display may be selected for receiving a specific traffic report (i.e., by intersection or highway) which would be provided to the operator as textual data via display 32 or audible data via speaker 44.

Although the exemplary system is described in terms of a hardware implementation, it is contemplated that some or all of the hardware functionality may be practiced entirely in software running on a GPS system. This software may be embodied in a carrier such as magnetic or optical disk or a radio frequency or audio frequency carrier wave.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A global positioning system (GPS) for displaying static cartographical data in accordance with a GPS signal, the system providing dynamically updated data, comprising:
    a receiver responsive to a global positioning signal, the receiver having,
    a first communication module responsive to a signal of a content provider, the content provider signal being defined as dynamic content, the dynamic content including positional information,
    a data processor for integrating the dynamic content with the static cartographical data, and
    a display device for displaying the integrated cartographical and dynamic content,
    whereby the dynamic content informs an operator of information relevant to the displayed cartographical data.

2. The global positioning system of claim 1, wherein the signal of the content provider is a radio frequency (RF) signal.

3. The global positioning system of claim 2, wherein the RF signal is a cellular transmission signal.

4. The global positioning device of claim 1, wherein the display is a "touch-screen" interface.

5. The global positioning device of claim 4, wherein the information includes information concerning hospitality venues.

6. The global positioning device of claim 5, wherein the hospitality information includes pricing information.

7. The global positioning device of claim 6, wherein information relevant to one of the hospitality venues is shown on the display device upon selecting an area of the touch screen corresponding to the displayed cartographical location of the hospitality venue.

8. The global positioning device of claim 1, wherein the dynamic content includes warnings of congested traffic patterns.

9. The global positioning device of claim 8, wherein the dynamic content includes alternative routes for avoiding the congested traffic pattern, the alternative routes being shown on the display device.

10. The global positioning device of claim 9, wherein the alternative routes and congested traffic patterns are designated as such on the display device.

11. A global positioning system (GPS) for displaying static cartographical data in accordance with a GPS signal, the system providing dynamically updated data, comprising:
    a receiver responsive to a global positioning signal, the receiver having,
    a first communication module responsive to a signal of a content provider, the content provider signal being defined as dynamic content,
    a filter for distinguishing between local dynamic content and non-local dynamic content,
    a data processor for integrating the dynamic local content with the static cartographical data, and
    a display device for displaying the integrated cartographical and dynamic content,
    whereby the dynamic content informs an operator of information relevant to the displayed cartographical data.

12. The global positioning system of claim 11, wherein the filter is programmable.

13. The global positioning system of claim 12, wherein the filter can be programmed by an operator to reject dynamic content which does not correspond to a desired type of content.

14. The global positioning system of claim 13, wherein the type of content is selected from a group consisting of hospitality venues and traffic information.

15. The global positioning system of claim 13, wherein the type of content can be further programmed to include a specific brand name.

16. A global positioning system (GPS) for displaying static cartographical data in accordance with GPS signals, the system providing dynamically updated data, comprising:
    a receiver means for receiving a global positioning signal, the receiver means having,
    communication means for receiving a signal of a content provider, the signal defining dynamic content,
    filter means for distinguishing between local dynamic content and non-local dynamic content of the dynamic content signal,
    data processing means for integrating the dynamic local content with the static cartographical data, and
    display means for displaying the integrated cartographical data and dynamic content,
    whereby the dynamic local content is provided to the global positioning system to dynamically inform an operator of information relevant to the displayed cartographical data.

* * * * *